United States Patent [19]

Krampe

[11] Patent Number: 4,986,148
[45] Date of Patent: Jan. 22, 1991

[54] DEVICE FOR REMOVING CASINGS AND COATINGS FROM GLASS FIBER CABLES

[76] Inventor: Josef Krampe, An der Vogelrute 32, 4715 Ascheberg-Herbern, Fed. Rep. of Germany

[21] Appl. No.: 249,853

[22] Filed: Sep. 27, 1988

[30] Foreign Application Priority Data

Oct. 29, 1987 [DE] Fed. Rep. of Germany ....... 3736581

[51] Int. Cl.⁵ .............................................. H02G 1/12
[52] U.S. Cl. ....................................... 81/9.4; 81/9.44; 30/90.1; 30/91.1
[58] Field of Search .................... 81/9.4, 9.44; 30/90.1, 30/91.1, 90.4

[56] References Cited

U.S. PATENT DOCUMENTS 1,857,731   5/1932   Lund ..................................... 30/91.1
3,871,078   3/1975   Ogle ..................................... 30/90.1
4,587,731   5/1986   Krampe ............................... 30/90.1

FOREIGN PATENT DOCUMENTS 0382067   8/1932   United Kingdom ................ 81/9.44

Primary Examiner—Frederick R. Schmidt
Assistant Examiner—Lawrence Cruz
Attorney, Agent, or Firm—Michael J. Striker

[57] ABSTRACT

A device for removing casings and coatings from glass fiber cables comprises two jaws which are movable relative to one another between a folded position in which they form a hollow body with an axis for receiving a glass fiber cable and an unfolded position, the jaws having inner walls, two holders mounted on opposite sides of the axis on the inner walls of the jaws and turnable toward one another from a point of mounting, and two cutters supported on the holders having cutting edges which extend transversely to the axis and directly abut against one another on the axis.

7 Claims, 3 Drawing Sheets

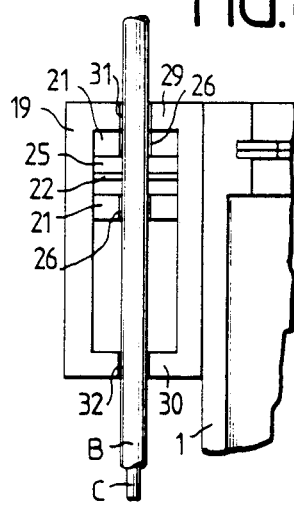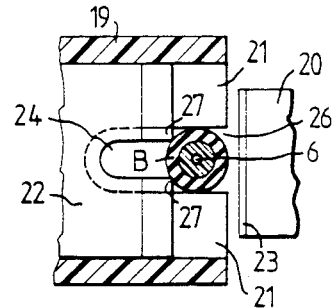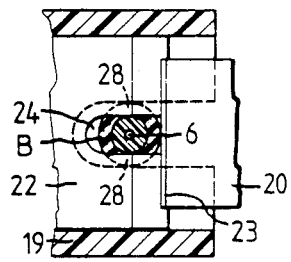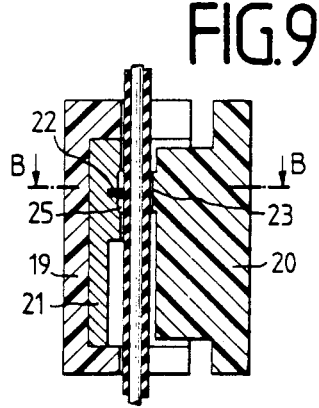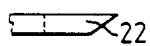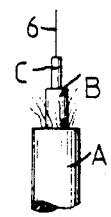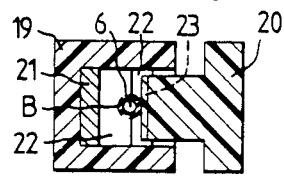

DEVICE FOR REMOVING CASINGS AND COATINGS FROM GLASS FIBER CABLES

BACKGROUND OF THE INVENTION

The present invention relates to a device for removing casings and coatings from glass fiber cables.

It is known that glass fiber cables are assembled to form a fiber bundle, and for protecting against mechanical damages introduced into flexible metal or synthetic plastic hoses. By cutting the hose and splitting the fiber bundles, the glass fibers or the like conductors are produced. They have a coating which is composed of a glass with a thickness of several thousandths millimeter and with a low refraction. Before the utilization of the glass fiber, the enclosing parts must be removed from it. For removing the hose or casing, cutters or other tools have been used. They, however, possess the disadvantages that these devices are very time consuming and often mechanically damage the glass fibers.

SUMMARY OF THE INVENTION

Accordingly, it is an object of the present invention to provide a device for removing casings and coatings from glass fibers which avoids the disadvantages of the prior art.

More particularly, it is an object of the present invention to provide a device for removing casings and coatings from glass fiber cables in which all working steps for releasing the glass fiber are performed with the same device, namely the elimination of the outer and inner casings as well as the peeling of the inner coating so as to obtain a glass fiber with a high degree of fineness.

In keeping with these objects and with others which will become apparent hereinafter, one feature of the present invention resides, briefly stated, in a device for removing casings and coatings from glass fiber which has two jaws which are connected turnably with one another for moving between a folded position in which they form a hollow body for receiving a glass fiber cable and an unfolded position, two holders mounted on inner walls of the jaws and extending toward an axis of the hollow body and also turnable relative to their mounting points, and cutters supported by the holders and having cutting edges which extend to the axis of the hollow body and abut against one another at the axis.

When the device is designed in accordance with the present invention, it achieves the above identified objects.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawings.

BRIEF DESCRIPTION OF THE DRAWINGS

FIG. 8 is a view showing one projection of the inventive device with a shaped cutter, on an enlarged scale;

FIG. 9 is a view showing a section of the projection with the closed jaws, taken along the line A—A in FIG. 7 and on an enlarged scale;

FIG. 10 is a view showing a section of the projection taken along the line B—B in FIG. 9;

FIG. 11 is a view showing a shaped cutter of the inventive device in a cutting position, on an enlarged scale;

FIG. 12 is a view showing the shaped cutter in its cutting position, on an enlarged scale;

FIG. 13 is a partial side view of the shaped cutter of the inventive device;

FIG. 14 is a partial view of a partially exposed glass fiber.

DESCRIPTION OF A PREFERRED EMBODIMENT

Figure 1:
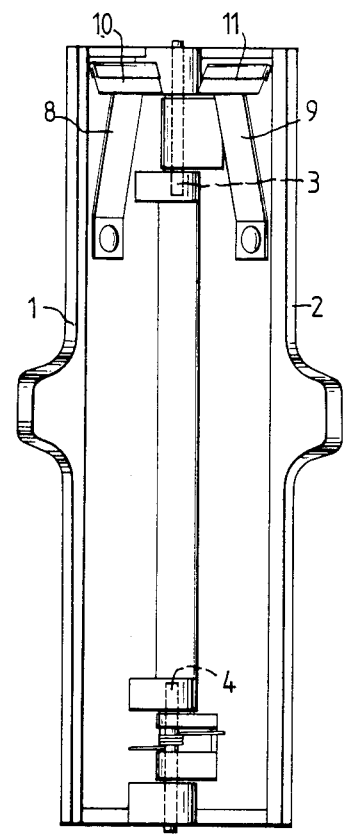
FIG. 1 is a view of a device for removing casings and coatings from glass fiber cables in accordance with the present invention with opened jaws.

A device for removing casings and coatings from glass fiber cables has two jaws 1 and 2 having a cross-section with a partially cylindrical shape. The jaws 1 and 2 are turnably connected with one another on their longitudinal sides by hinges 3 and 4, so that they can be folded to form a hollow body 5. The hollow body 5 serves for receiving a glass fiber 6 from which a casing has been removed and which has a coating C to be eliminated. The device is provided with cutter holders 8 and 9 which are formed as springs and mounted on an end side of an inner wall of the jaws 1 and 2. The cutter holders 8 and 9 extend from their mounting points turnably relative to one another and inclined to an axis of the hollow body. Cutters 10 and 11 are provided on the free ends of the cutter holders and have cutting edges which extend transversely to the axis of the hollow body and lie directly against one another.

Figure 3:
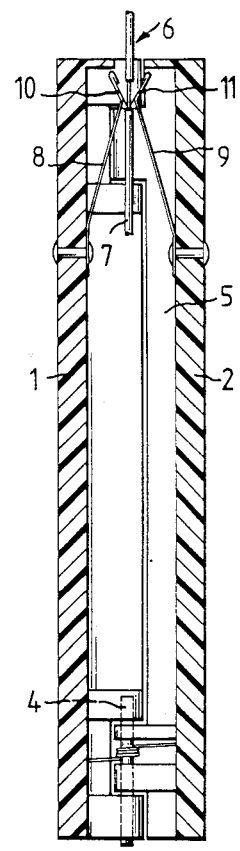
FIG. 3 is a view showing a cross-section of the device in a working position, or in other words, with an inserted glass fiber and closed jaws.
Figure 2:
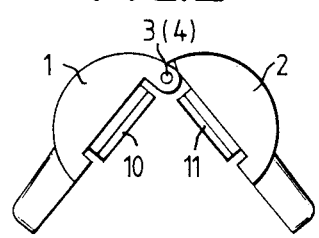
FIG. 2 is a plan view of the inventive device.
Figure 4:
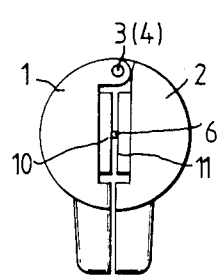
FIG. 4 is a plan view of the device shown in FIG. 3.

The above described device is shown in FIG. 3 in a working position. A glass fiber 6 from which the coating C is removed is located between the jaws 1 and 2 and the cutters 10 and 11. Since the cutters 10 and 11 are in contact with the glass fiber 6, the coating C is completely released during pulling out of the glass fiber 6 from the hollow body 5 in the course of a peeling process. It is important that the cutters 10 and 11 are spring-biased, or in other words, apply only a low pressure to the glass fiber 6 so that no classic cutting process is performed here. An important feature therefore is that the removal of the coating C is performed practically without damage to the glass fiber 6.

Figure 5:
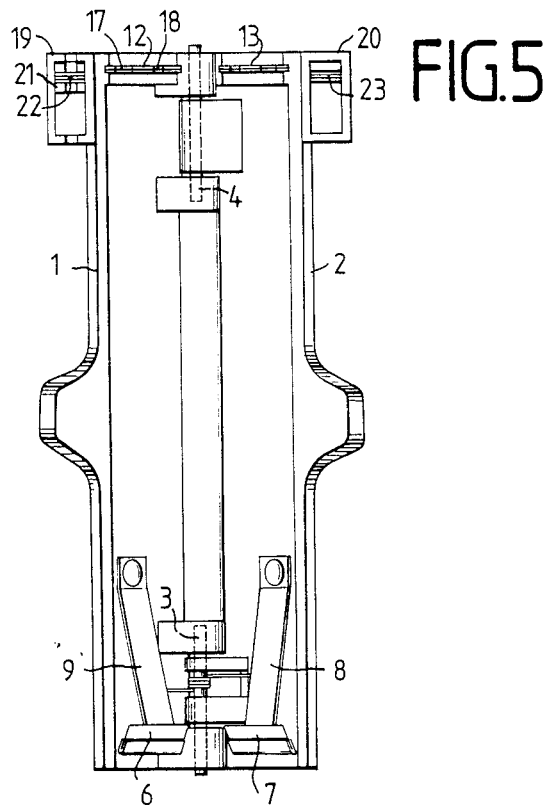
FIG. 5 is a view showing the device in accordance with the present invention with the opened jaws.
Figure 6:
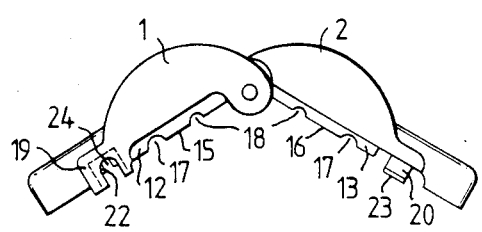
FIG. 6 is a plan view of the device of FIG. 5.
Figure 7:
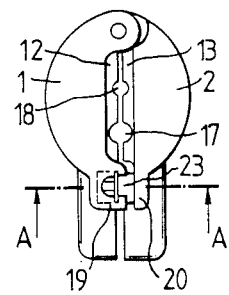
FIG. 7 is a plan view of the device in accordance with the present invention with folded jaws.

As can be seen from FIG. 5, blades 12 and 13 are provided on the opposite side of the device on its end side, and particularly on each inner wall of the jaws 1 and 2. They lie in a plane exactly opposite to and transversely to the axis of the hollow body. The blades 12 and 13 have in their profile semi-circular recesses 17 and 18 provided on their cutting edges and having different radii.

In accordance with a further feature of the present invention, housing-like projections 19 and 20 are provided in the region of the blades 12 and 13 outwardly on the longitudinal edges of the jaws 1 and 2. The projection 19 is formed as a hollow body with a shaped cutter 22 which is mounted in it on a cutter holder 21. The projection 20 is provided with an extending formation 23 located opposite to the shaped cutter 22. The shaped cutter 22 has a U-shaped recess 24 and lies in a horizontal gap 25 of the cutter holder 21 as can be seen in FIG. 8. The front edge of the shaped cutter 22 is wedge-shaped as shown in FIG. 13 and spring-biased against the outer surface of the cutter holder 21 as shown in FIG. 11. Moreover, the cutter holder 21 is provided with a notch 26 shown in FIGS. 8 and 11, which extends immediately before the U-shaped recess 24 perpendicularly, and has a size which substantially corresponds to the diameter of an inner casing B. Finally, the shaped cutter 22 is provided with corner cutting edges 27 which lie on the opposite side of the U-shaped recess 24 opposite to one another at the location where the casing B is introduced in the U-shaped recess 24 during the cutting process as shown in FIG. 11.

In a glass fiber cable in which the outer casing A is removed with the blades 12 and 13 and a further second inner casing B is provided with a coating C around the glass fiber 6, the inner casing B is removed with the shaped cutter 22. This is performed in that the inner casing B is introduced into the projection 19, while the vertical notch 26 of the cutter of holder 21 provides for the centering of the casing B before the shaped cutter 22 or its U-shaped recess 24 as shown in FIG. 11. During folding of the jaws 1 and 2, the casing B is pressed by the projection 20 with the formation 23 in the U-shaped recess 24. Thereby the edges 27 penetrate into the casing B and cut out the segment part 28 as shown in FIG. 12. The remaining segment part is released automatically as long as the formation 23 is separated from the projection 19 during unfolding of the jaws 1 and 2 and the glass fiber 6 is released from the U-shaped recess 24.

Notches 31 and 32 are provided in the lower and upper transverse legs 29 and 30 of the projection 19 along the vertical axis of the notch 26 in the holder 21. They perform a centering and arresting function during the separating process of the inner casing B from the glass fiber 6.

Now the coating C which is located on the glass fiber 6 has to be removed. It is performed as described hereinabove by the cutters 10 and 11. The glass fiber 6 is pulled out of the hollow body 5 which is formed by the closed jaws 1 and 2, and the cutters 10 and 11 peel off the coating C.

In the device in accordance with the present invention, all insulating structures on glass fibers such as the outer casing A and the inner casing B as well as the coating C can be taken care in the same device. On one end side of the device the removal of the cable casing A and B can be performed, while on the other end side of the device the peeling of the coating C which directly, coats the glass giber 6 can be performed.

It will be understood that each of the elements described above, or two or more together, may also find a useful application in other types of constructions differing from the types described above.

While the invention has been illustrated and described as embodied in a device for removing casings and coatings from glass fiber cables, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed as new and desired to be protected by Letters Patent is set forth in the appended claims:

1. A device for removing casings and coatings from glass fiber cables, comprising two jaws which are movable relative to one another between a folded position in which they form a cylindrical hollow body with an axis for receiving a glass fiber cable and an unfolded position, said jaws having inner walls; two flat springs mounted on opposite sides of said axis on said inner walls of said jaws at a distance form one end side of said jaws and turnable toward one another from a point of mounting; and two cutters supported on said flat springs and having cutting edges which extend transversely to said axis and oppositely to said flat springs at an acute angle to said axis and directly abut against one another on said axis, said flat springs being arranged to spring-bias said cutters toward said axis and, therefore, toward a glass fiber cable.

2. A device as defined in claim 1; and further comprising blades provided inwardly at an end side of said jaws which is opposite to said cutters and extending transversely to said axis of said hollow body.

3. A device as defined in claim 2, wherein said blades have cutting edges provides with semi-circular recesses of different radii.

4. A device as defined in claim 1, wherein said jaws have longitudinal edges facing away of said axis and are provided on said longitudinal edges with projections, one of said projections being hollow and accommodating a shaped cutter having a U-shaped recess with corner edges forming cutting edges, while the other of said projections having a projecting portion extending towards said shaped cutter in the folded condition of said jaws.

5. A device as defined in claim 4, wherein said U-shaped recess in said shaped cutter has a semi-spherical shape.

6. A device as defined in claim 4, wherein said one projection is provided with a holder which holds said shaped cutter and is provided with a cutout opposite to said U-shaped recess of said shaped cutter.

7. A device as defined in claim 4, wherein said one projection has two transverse legs spaced from one another in an axial direction and having notches opposite to said U-shaped recess of said shaped cutter.

* * * * *